US009562488B1

(12) United States Patent
Bowling et al.

(10) Patent No.: US 9,562,488 B1
(45) Date of Patent: Feb. 7, 2017

(54) FUEL INJECTOR CALIBRATION METHOD AND APPARATUS

(71) Applicant: BG Soflex LLC, Virginia Beach, VA (US)

(72) Inventors: Bruce A. Bowling, Linthicum Heights, MD (US); Albert C. Grippo, Virginia Beach, VA (US)

(73) Assignee: BG Soflex LLC, Virginia Beach, VA (US)

( * ) Notice: Subject to any disclaimer, the term of this patent is extended or adjusted under 35 U.S.C. 154(b) by 0 days.

(21) Appl. No.: 14/861,807

(22) Filed: Sep. 22, 2015

(51) Int. Cl.

| | |
|---|---|
| ***G05D 1/00*** | (2006.01) |
| ***G05D 3/00*** | (2006.01) |
| ***G06F 7/00*** | (2006.01) |
| ***G06F 17/00*** | (2006.01) |
| ***F02D 41/24*** | (2006.01) |
| ***F02D 41/26*** | (2006.01) |
| ***F02M 51/06*** | (2006.01) |

(52) U.S. Cl.
CPC ....... *F02D 41/2467* (2013.01); *F02D 41/2432* (2013.01); *F02D 41/26* (2013.01); *F02M 51/061* (2013.01)

(58) Field of Classification Search
CPC ..... F02D 41/2432; F02D 41/26; F02M 51/061
USPC ........................................................ 701/1, 33
See application file for complete search history.

*Primary Examiner* — Maceeh Anwari
(74) *Attorney, Agent, or Firm* — Procopio, Cory, Hargreaves & Savitch LLP

(57) ABSTRACT

A method for calibrating an electronic fuel injector may include: setting a supply voltage to a control module; applying a control voltage signal having a pulse width to an electronic fuel injector by the control module; determining whether a fuel pressure of a fuel supply to the electronic fuel injector decreases by a predetermined amount; and in response to determining that the fuel pressure of the fuel supply to the electronic fuel injector decreases by the predetermined amount, recording the pulse width and the supply voltage to the control module.

22 Claims, 7 Drawing Sheets

FUEL INJECTOR CALIBRATION METHOD AND APPARATUS

BACKGROUND

Over the last 30 years there have been increasing proportions of internal combustion engines that are equipped with electronic fuel injection (EFI). The reason for this is multifold: increased reliability, performance, and longevity are key factors, along with significantly tighter engine calibration over the full engine operating range. As of the end of the 1990's, practically all original equipment manufacturer (OEM) passenger car engines were converted from carburetion to EFI; smaller engines like motorcycles followed suit.

The automotive aftermarket also followed the trend, offering EFI conversion systems for existing engine applications. Many of these EFI conversion systems were offered to retrofit existing carburetor-equipped engines, with the carburetor eliminated and replaced with a throttle body for air flow regulation. Other systems provided by the aftermarket serve as a replacement to OEM engine controls, permitting adjustments to calibrations and operating parameters.

Engine controls for automotive aftermarket engines most often employ fuel injection methods involving port or centralized throttle fuel metering strategies. These systems use one or a plurality of electromechanical solenoids to control the flow of a combustible hydrocarbon such as gasoline and inject the fuel into the airstream in order to produce a desired air-fuel ratio for combustion within the cylinder. These fuel injector solenoids are most often located in the individual port runners upstream of the air intake valves, or right above or below the air throttle plates.

An automotive engine has a large dynamic operating range and the air-fuel operating range requirements can be extreme, especially for a high-output or air boosted engine. This dynamic operating range is often expanded compared to an OEM application, which places additional demands on the controls. In particular, the operating range of fuel injectors for aftermarket use can place the fuel injectors outside of their intended use. Fuel injectors are sized such that they provide the required fuel mass at the highest engine mass air flow rates. High crankshaft revolutions-per-minute (RPMs) and high mass air flow rates require larger injector flow rates. However, these same injectors are needed to accurately operate the engine during idle and low engine output regions. This low operating range translates into very small time duration pulse widths for operating the fuel injectors.

Solenoid fuel injectors utilize an electromechanically-operated pintle valve which is magnetically coupled to an electric solenoid. A current flow in the solenoid produces a magnetic field, and this magnetic field causes the pintle valve to move within the bore of the fuel injector. The pintle valve movement opens a metered orifice arrangement which permits the flow of fuel. The valve as designed is intended to operate in a flow/no-flow arrangement, and the duration of the applied solenoid current dictates the amount of mass fuel flow.

Due to the fact that the current within a solenoid coil ramps up after its initial application due to the inductance of the actuator solenoid coil, there is an inherent lag time between the application of solenoid current and the build-up of the magnetic field around the coil. This in turn causes a delay in time between the first application of current and the movement of the pintle valve. Determination of this time delay is important for the prediction of the mass of fuel flow through the injector for a given solenoid current application time.

The ramp-up time of the solenoid current is dependent on the inductance of the coil, the coil resistance, and the applied voltage. In a practical vehicle engine application, the voltage available to the fuel injector solenoid is not always constant. Situations such as cold starting, vehicle charging variability, electrical load variations such as headlights, heater blowers, etc., affect the instantaneous voltage available to the solenoid. This change in voltage will change the dynamic rate of solenoid energizing and hence, the time delay in pintle valve movement. The effect of this voltage variation is significant over the realistic range of available battery voltages within a vehicle.

It is therefore important to determine the dynamic characteristics of the fuel injector opening time as a function of battery voltage. However, information regarding these dynamic characteristics is not readily available.

SUMMARY

Apparatuses and methods for determining the dynamic operation of an automotive engine fuel injector are provided.

According to various embodiments there is provided a method for calibrating an electronic fuel injector. In some embodiments, the method may include: setting a supply voltage to a control module; applying a control voltage signal having a pulse width to an electronic fuel injector by the control module; determining whether a fuel pressure of a fuel supply to the electronic fuel injector decreases by a predetermined amount; and in response to determining that the fuel pressure of the fuel supply to the electronic fuel injector decreases by the predetermined amount, recording the pulse width and the supply voltage to the control module.

According to various embodiments there is provided an apparatus for calibrating an electronic fuel injector. In some embodiments, the apparatus may include: a control module installed in a vehicle; and a variable power supply configured to provide a supply voltage to the control module.

The control module may include: a processor; a storage unit; and driver circuitry configured to provide a control voltage signal to an electronic fuel injectors installed in the vehicle. The control module configured to: apply the control voltage signal having a pulse width to the electronic fuel injector; determine whether a fuel pressure of a fuel supply to the electronic fuel injector decreases by a predetermined amount based on a signal received from a fuel pressure sensor; and in response to determining that the fuel pressure of the fuel supply to the electronic fuel injector decreases by a predetermined amount, record the pulse width and the supply voltage to the control module.

According to various embodiments there is provided a non-transitory computer readable medium having stored thereon instructions for causing one or more processors to perform a calibration method for an electronic fuel injector. In some embodiments, the non-transitory computer readable medium may include instructions for setting a supply voltage to a control module; applying a control voltage signal having a pulse width to an electronic fuel injector by the control module; determining whether a fuel pressure of a fuel supply to the electronic fuel injector decreases by a predetermined amount; and in response to determining that the fuel pressure of the fuel supply to the electronic fuel injector decreases by the predetermined amount, recording the pulse width and the supply voltage to the control module.

Other features and advantages of the various embodiments should be apparent from the following description which illustrates by way of example aspects of the various embodiments.

BRIEF DESCRIPTION OF THE DRAWINGS

Aspects and features of the various embodiments will be more apparent by describing example embodiments with reference to the accompanying drawings, in which.

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

Figure 1:
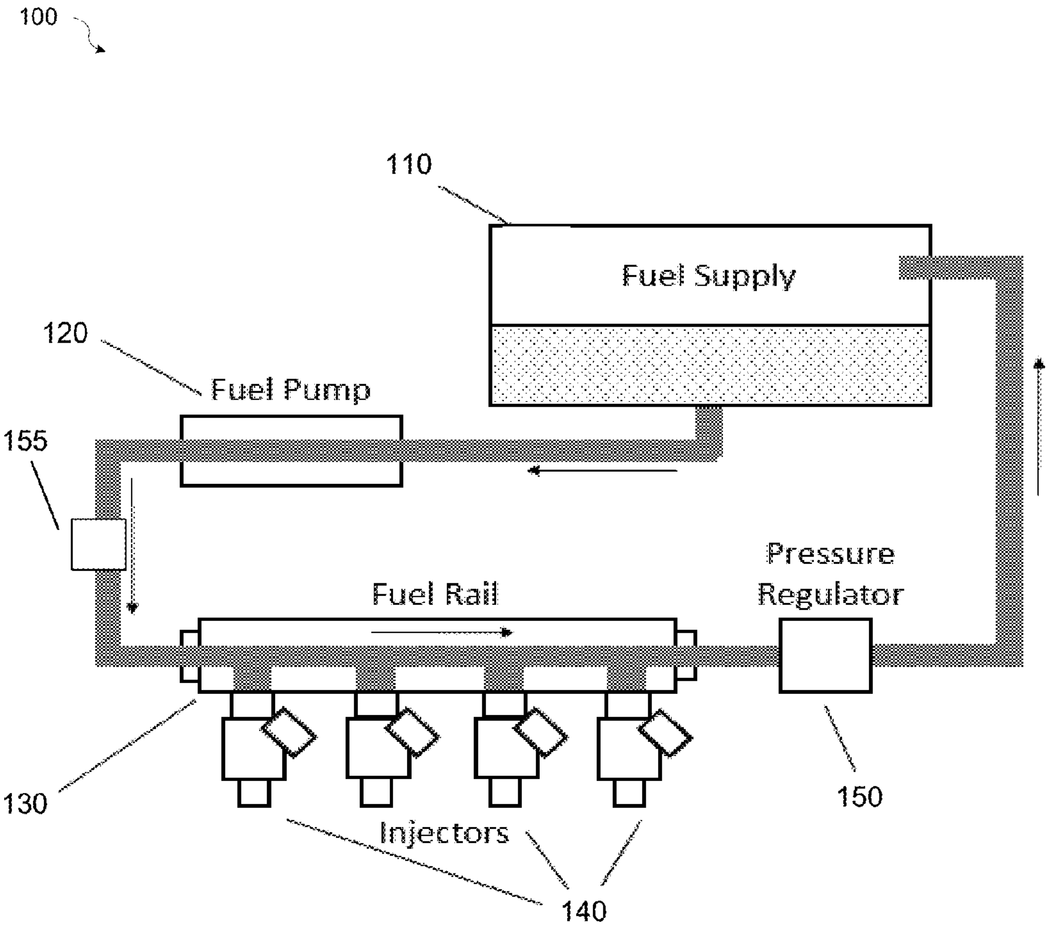
RELATED ART FIG. 1
FIG. 1 is a diagram illustrating a multiport fuel injection system commonly used for aftermarket fuel injection setups.

FIG. 1 is a diagram illustrating a multiport fuel injection system 100 commonly used for aftermarket fuel injection setups. A fuel tank 110 may hold a reservoir of hydrocarbon fuel in either in gaseous or liquid form. A fuel pump 120 may transfer the fuel from the tank to a fuel rail 130. The fuel rail 130 may mechanically mount a plurality of electronic fuel injectors 140 and provide the fuel under pressure such that the fuel injectors 140 may provide regulated fuel mass to the engine. A pressure regulator 150 may bleed excess fuel back to the fuel tank in order to maintain a regulated fuel rail pressure. The pressure regulator may provide a constant fuel rail pressure, additionally multiport fuel injection system 100 may contain a blocking valve 155 to hold the pressure even if the fuel pump 120 is not operating.

Figure 2:
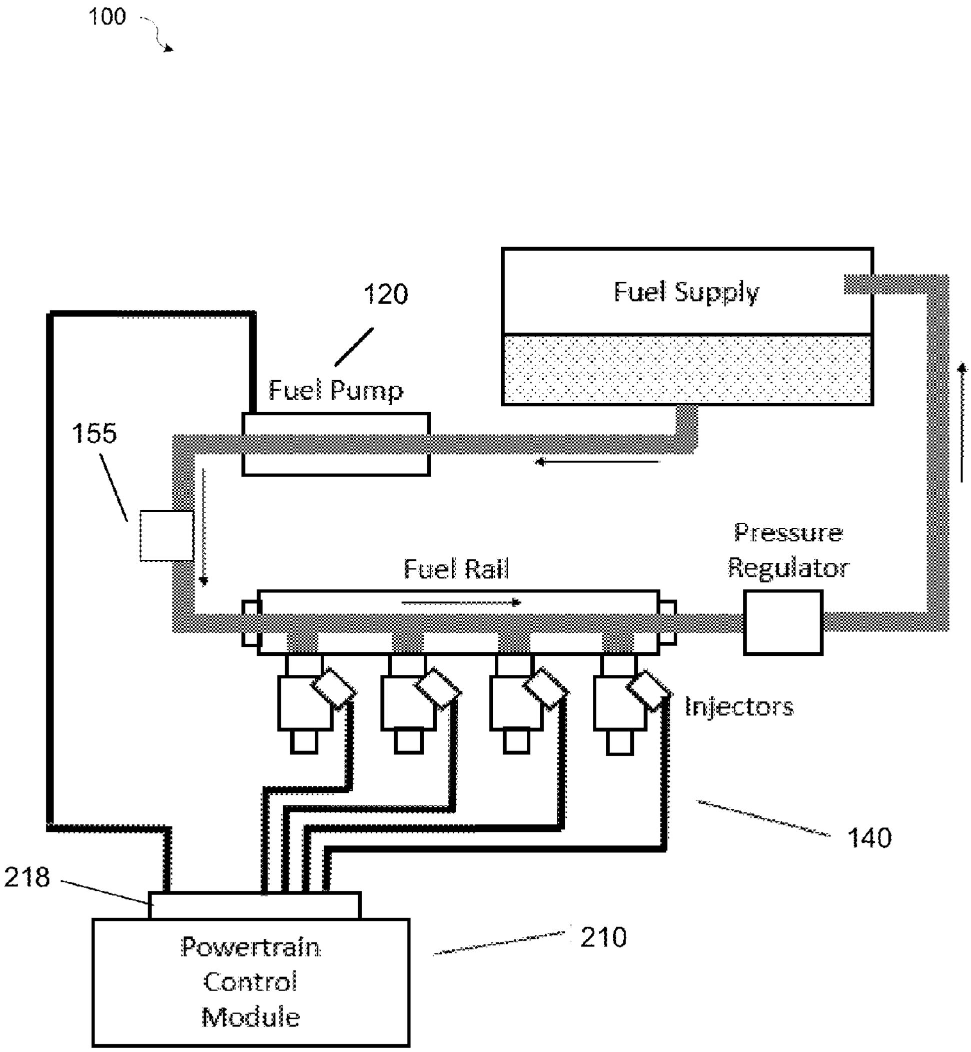
RELATED ART FIG. 2
FIG. 2 is a diagram illustrating electronic controls for the multiport fuel injection system of FIG. 1.

FIG. 2 is a diagram illustrating electronic controls for the multiport fuel injection system 100 of FIG. 1. The Powertrain Control Module 210 (PCM) may be a microprocessor-based controller programmed with algorithms for internal combustion engine control. The PCM 210 may provide control signals for the fuel pump 120 and electronic fuel injectors 140 via driver circuitry 218. Sensors (not shown), such as intake and coolant temperature sensors, engine position sensor, ignition control, etc., may provide engine operating condition information to the PCM 210. The PCM 210 may provide real-time control for engine operation and fault diagnostics. Algorithms contained in the PCM 210 firmware may be executed on the PCM 210 to provide the control law for the engine.

Various actuators, for example, but not limited to, the electronic fuel injectors 140, may be calibrated in order for the PCM 210 to provide accurate fuel control. An electronic fuel injector is an electromagnetically-controlled valve that provides on/off fuel mass flow control. Electronic fuel injectors (e.g., the electronic fuel injectors 140) may have parameters corresponding physical characteristics that may be calibrated and the calibrated parameters made available to the PCM 210 in order to provide predictable fuel delivery to the internal combustion engine.

For OEM electronic fuel injectors, these parameters may be calculated off-line using specialized fuel flow testing equipment. For calibration of the electronic fuel injectors 140 for automotive applications, the electronic fuel injector flow parameter may be provided as a single value for static fuel flow with the electronic fuel injector fully open. Electronic fuel injector static flow is an important parameter for engine control; however, dynamic fuel injector parameters are also important for controlling overall mass fuel flow.

Figure 3:
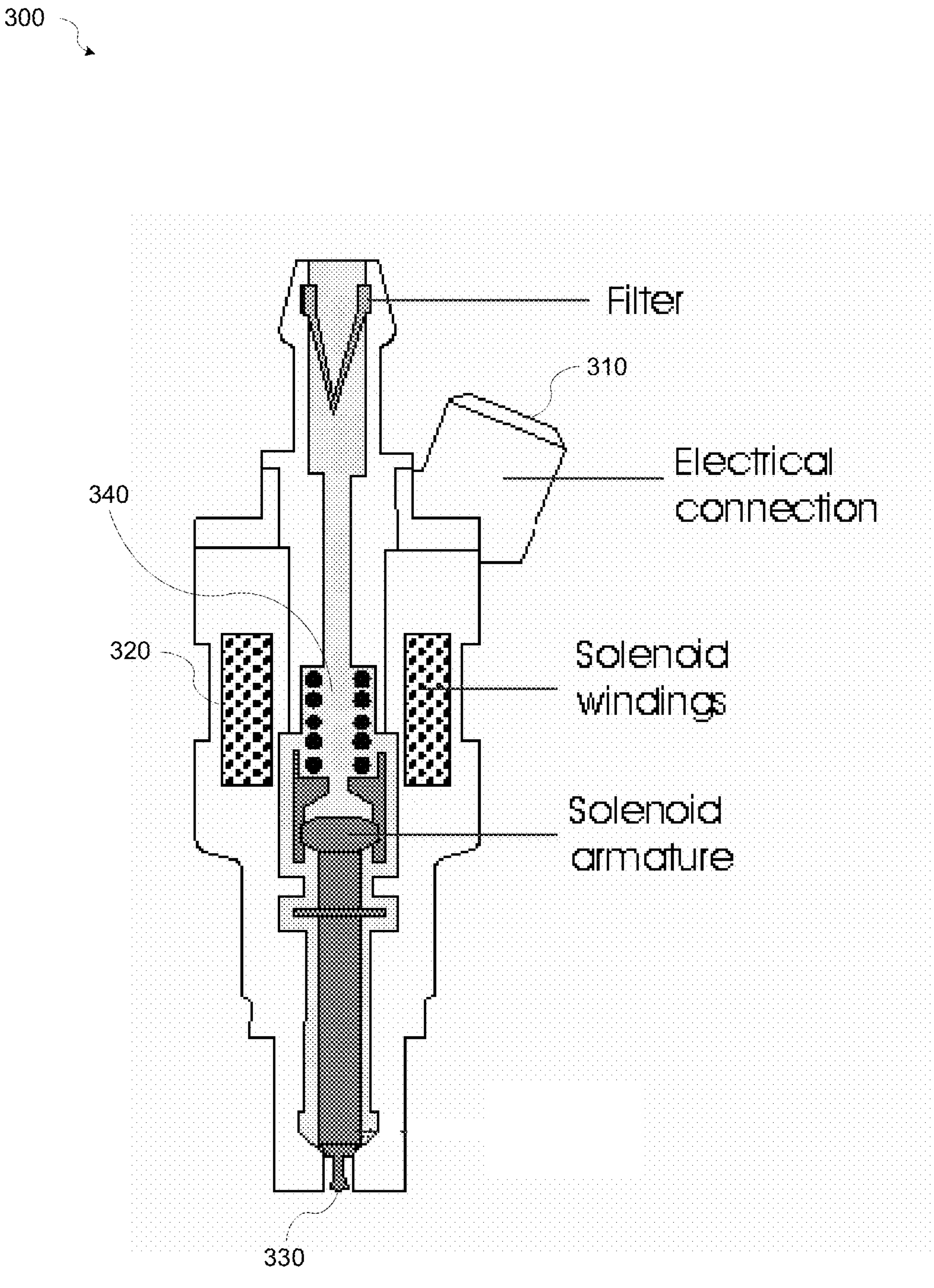
RELATED ART FIG. 3
FIG. 3 is a diagram illustrating a cross-section of automotive electronic fuel injector.

FIG. 3 is a diagram illustrating a cross-section of automotive electronic fuel injector 300. The electronic fuel injector 300 may operate with an electronic control signal applied to a fuel injector solenoid 320 through an electrical connector 310. The control signal may generate a magnetic field in the fuel injector solenoid 320 opening a normally-closed pintle valve 330, and the pintle valve 330 may open a fuel chamber 340 to allow passage of fuel into the engine.

There may be a finite amount of time from the application of the control signal and the ramp-up to a given current to operate the fuel injector solenoid 320. The amount of time may depend on several factors including, for example, but not limited to, solenoid inductance, wiring resistance, and applied voltage. The applied voltage may vary even over a short period of time due to vehicle charging system voltage variations resulting from engine RPM changes and electrical loads (e.g., headlights, windshield wipers, blower motors, etc.). The voltage variations may directly affect electronic fuel injector open time (i.e., the time required for the pintle valve 330 to open), also referred to herein as the injector open time, by changing the rate of current ramp-up in the fuel injector solenoid 320.

Figure 4:
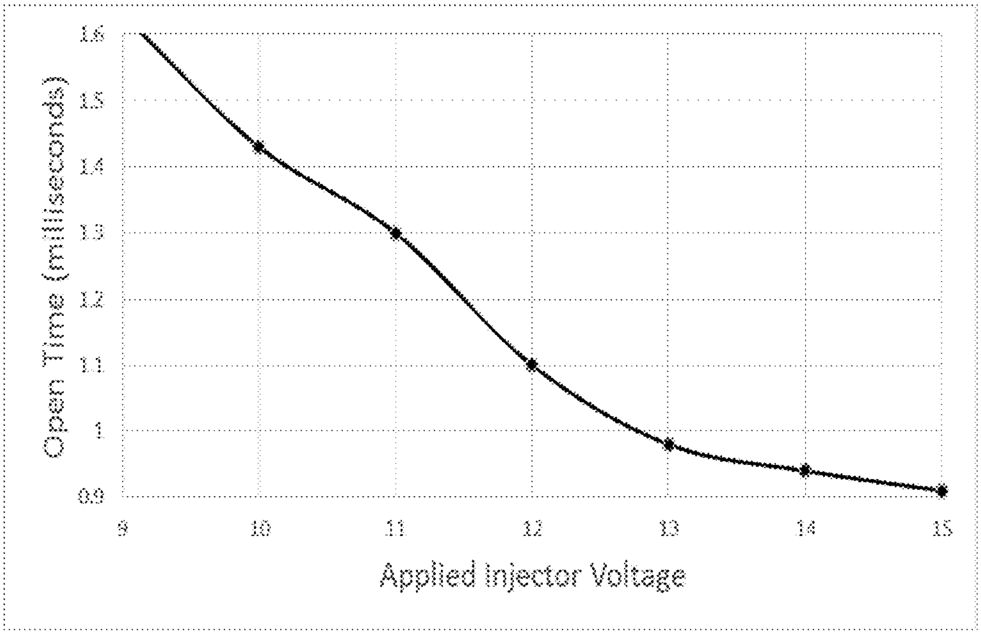
FIG. 4 is a graph illustrating the effect of control signal voltage on electronic fuel injector pintle valve open time.

FIG. 4 is a graph 400 illustrating the effect of control signal voltage on injector open time. FIG. 4 illustrates that as control signal voltage (i.e., applied injector voltage) decreases, for example, due to charging system voltage variations, the time needed for the pintle valve (e.g., the pintle valve 330) to open (i.e., the injector open time) may increase.

The force on an electronic fuel injector pintle valve (e.g., the pintle valve 330) due to current flow in a fuel injector solenoid (e.g., the solenoid 320) may be expressed by Equation (1):

$$F = \frac{(NI)^2 \mu_0 A}{2g^2} \qquad (1)$$

In Equation (1), F is the solenoid force, N is the number of turns on the solenoid, I is the fuel injector solenoid current, $\mu_0$ is a permeability constant, A is the cross-sectional area of the fuel injector solenoid, and g is the gap between the fuel injector solenoid and the pintle valve.

For an automotive throttle body fuel injector or port fuel injector, the parameters N, A, and g may be set during design and manufacturing, leaving the fuel injector solenoid current I as an available parameter for controlling the pintle valve force (i.e., force (F) is a function of $I^2$).

The fuel injector solenoid and pintle valve complete a resistive-inductive circuit, and movement of the pintle may change the inductance of the circuit. The equation for voltage with changing circuit inductance may be expressed by Equation (2):

$$V = RI + \frac{d\lambda}{dt} \quad (2)$$

In Equation (2), V is the applied voltage (i.e., the control signal), R is the resistance of the fuel injector solenoid coil, and λ is the flux linkage. The flux linkage, λ, is dependent on the current I in the fuel injector solenoid coil and the air gap distance x between the fuel injector solenoid coil and the pintle valve. Equation (2) may be rewritten as Equation (3):

$$V = RI + \left(L + \frac{\partial\lambda(x, I)}{\partial I}\right)\cdot\frac{dI}{dt} + \frac{\partial\lambda(x, I)}{\partial x}\cdot\frac{dx}{dt} \quad (3)$$

In Equation (3), L represents the fuel injector solenoid inductance. The first term in the expansion of Equation (3) is resistive and represents an associated voltage drop. The second term is an inductive voltage drop due to changing current. The third term represents the back electromotive force (EMF) generated by the pintle valve moving in the solenoid. Practical use of Equation (3) requires knowledge of the magnetic characteristics of the pintle valve and fuel injector solenoid, which are not readily available.

The rise of fuel injector solenoid current, I, over time may be represented to first-order as a function of time, applied, voltage, and loop resistance by Equation (4):

$$I = \frac{V}{R}\left(1 - e^{\frac{Rt}{L}}\right) \quad (4)$$

In Equation (4), V is the applied voltage (i.e., the control signal) across the fuel injector solenoid, R is the circuit resistance which includes the fuel injector solenoid coil, driver electronics, wiring, etc.), t is the elapsed time that the voltage is applied, and L is the fuel injector solenoid inductance. Rearranging Equation (4) to solve for t results in Equation (5):

$$t = \frac{-L}{R}\ln\left(1 - \frac{RI}{V}\right) \quad (5)$$

Equation (5) determines the time, t, required for the fuel injector solenoid current, I, to ramp up to a given after application of the voltage, V (i.e., the control signal). Equation (5) shows that the fuel injector solenoid current ramp-up time, t, depends on both the circuit resistance, R, and the applied voltage, V. For multiport fuel injection systems (e.g., the multiport fuel injection system 100), the value of the circuit resistance, R, may not vary appreciably, other than from temperature effects on solenoid resistance. Thus, the applied voltage, V (i.e., the control signal), may be a primary factor affecting the fuel injector solenoid current ramp-up time, t. Therefore, the change in electronic fuel injector opening time as a function of applied voltage, V, may be determined. Analytical calculation methods may be possible, but may provide only a rough indicator for a correction factor.

Aspects of the various embodiments may measure injector open time based on control signal pulse width with respect to control signal voltage. Further, aspects of the various embodiments may perform the injector open time measurements using the PCM (e.g., the PCM 210) driver circuitry for one or more electronic fuel injectors to replicate conditions experienced by the one or more electronic fuel injectors that may be installed in an internal combustion engine.

Figure 5:
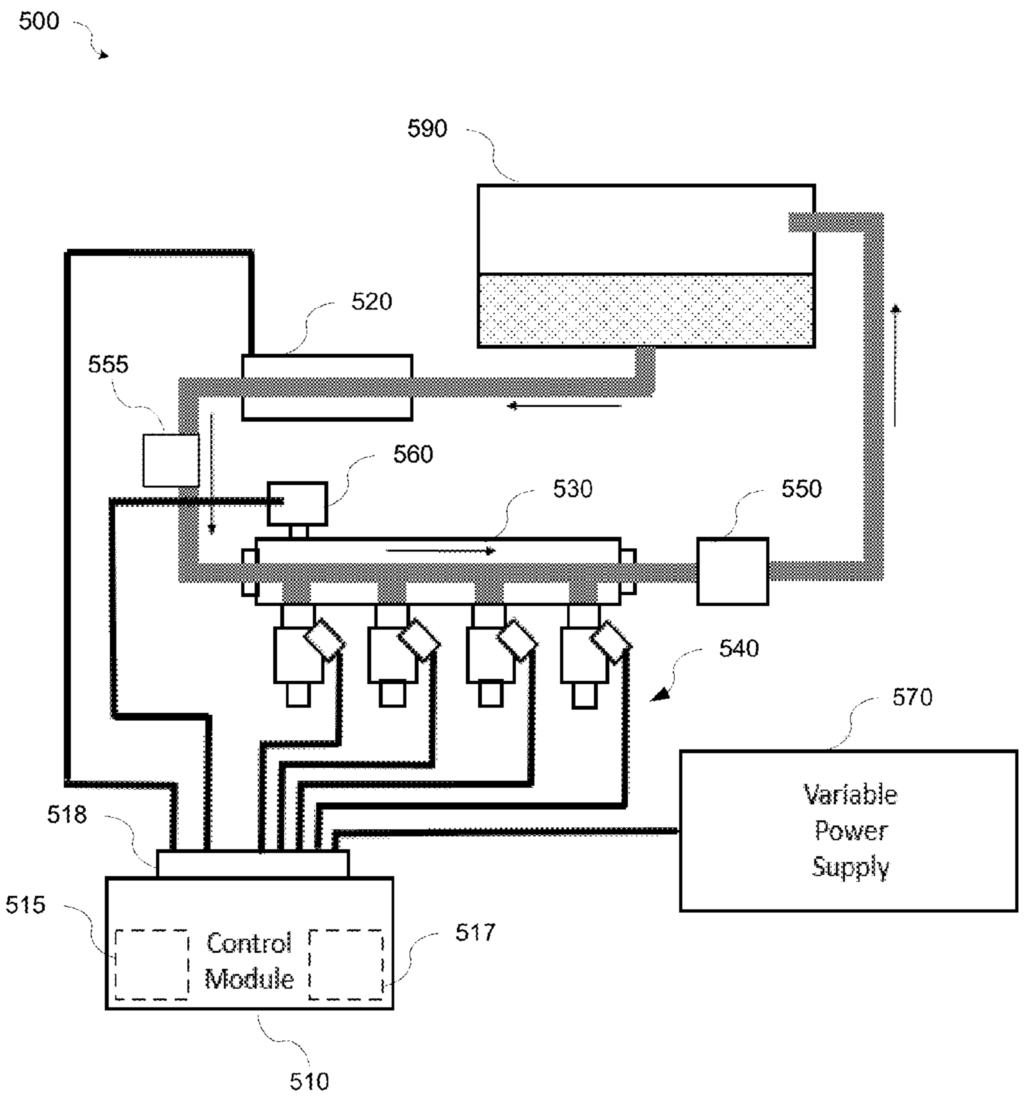
FIG. 5 is a diagram illustrating an electronic fuel injector calibration system according to various embodiments.

FIG. 5 is a diagram illustrating an electronic fuel injector calibration system 500 according to various embodiments. Referring to FIG. 5, the multiport fuel injection calibration system 500 may include a fuel tank 590, a fuel pump 520, a fuel rail 530, a pressure regulator 550, a blocking valve 555, and one or more electronic fuel injectors 540. These components may be similar to the corresponding components in the multiport fuel injection system 100 previously described and illustrated in FIGS. 1 and 2 and so will not be further described. In various embodiments, the above components of the multiport fuel injection calibration system 500 may be installed in a vehicle.

The multiport fuel injection calibration system 500 may also include a control module 510, for example, but not limited to a PCM (e.g., the PCM 210) or another controller, a fuel pressure sensor 560, and a variable power supply (VPS) 570. The control module 510 may include a control unit 515, for example, but not limited to, a microprocessor, a microcontroller, or other programmable device, and may further include a storage unit 517, for example, but not limited to, RAM, ROM, EEPROM, or other memory, or combinations thereof, and driver circuitry 518 configured to provide control signals to the electronic fuel injectors 540 and the fuel pump 520.

The control unit 515 may cause the control module 510 to provide control signals to the one or more electronic fuel injectors 540 and to the fuel pump 520. The fuel pressure sensor 560 may sense fuel pressure in the fuel rail 530 (or at another location in the multiport fuel injection calibration system 500). In various embodiments, the control module 510 and the fuel pressure sensor 560 may be installed in a vehicle. The VPS 570 may provide supply voltage to the control module 510 in place of voltage supplied from a vehicle electrical system.

The control unit 515 may cause the control module 510 to provide pulsed voltage control signals to one of the one or more electronic fuel injectors 540 installed in an engine and may receive a signal indicating fuel pressure from the fuel pressure sensor 560. The control module 510 (e.g., the control unit 515) may be configured to control the pulse widths of the pulsed voltage control signals. The VPS 570 may be configured to provide adjustable supply voltages to the control module 510. Various embodiments of the present inventive concept may determine an injector open time based on the pulse width of the pulsed voltage control signals at various supply voltages of the control module 510.

The VPS 570 may provide a preset supply voltage to the control module 510. The preset supply voltage may be a minimum supply voltage necessary for operation of the control module 510. For example, the VPS 570 may provide a minimum supply voltage of about twelve volts to the control module 510. The control unit 515 may cause the control module 510 to provide a pulsed voltage control signal having a preset pulse width to one of the one or more electronic fuel injectors 540 and may monitor the fuel pressure in the fuel rail 530 (or at another location in the multiport fuel injection system 500) via the fuel pressure sensor 560. The preset pulsed voltage control signal pulse width may be a minimum pulse width.

The minimum pulse width may be based on, for example, but not limited to, the type of electronic fuel injector 540 and/or control module 510 (e.g., manufacturer, model, etc.). For example, the minimum pulse width may be about 50 microseconds (μs) (or another value). The control module 510 (e.g., the control unit 515) may increase the pulse width in increments, for example, in increments of 50 μs (or another value) until the control module 510 receives a signal from the fuel pressure sensor 560 indicating a decrease in fuel pressure, or until the pulse width reaches a maximum pulse width (for example, about five milliseconds (ms) or another value). The decrease in fuel pressure may indicate that the pulsed voltage control signal caused the pintle valve (e.g., the pintle valve 330) of the electronic fuel injector (e.g., electronic fuel injector 540) to open.

The control unit 515 of the control module 510 may record (e.g., in the storage unit 517 of the control module 510) the preset supply voltage provided by the VPS 570 and the injector open time (i.e., the pulse width) at the preset supply voltage. One of ordinary skill in the art will appreciate that the minimum pulse width, the maximum pulse width, and the pulse width increment described above are merely exemplary and that other values for the minimum pulse width, the maximum pulse width, and the pulse width increment may be used without departing from the scope of the present inventive concept.

The supply voltage to the control module 510 may affect the amplitude of the pulsed voltage control signals and therefore, the injector open time. After the control module 510 (e.g., the control unit 515) records the injector open time at the preset supply voltage, the control unit 515 of the control module 510 may cause the VPS 570 to increment the supply voltage provided to the control module 510. For example, the control module 510 (e.g., the control unit 515) may cause the VPS 570 to increment the supply voltage by 0.5 volts. The control unit 515 of the control module 510 may provide a signal to operate the fuel pump 520 for a short period (e.g., several seconds) to recharge the fuel pressure in the fuel rail 530. In various embodiments, the control unit 515 may cause the control module 510 to provide a control signal to the VPS 570 to increment the supply voltage. In various embodiments, the control unit 515 may cause the control module 510 to provide an indication, for example, but not limited to, an indicator light, audible beep, etc., for manual adjustment of the control module 510 supply voltage provided by the VPS 570.

After causing the VPS 570 to increment the supply voltage and causing the fuel pump 520 to recharge the fuel pressure in the fuel rail 530, the control unit 515 may cause the control module 510 to reset the pulse width to the minimum pulse width (e.g., 50 or another value) and provide the pulsed voltage control signals to the one of the one or more electronic fuel injectors to determine the injector open time at the incremented supply voltage to the control module 510. For example, the supply voltage provided to the control module 510 by the VPS 570 may be set to twelve volts and the pulse width of the pulsed voltage control signal may be set to 50 μs. The control unit 515 may cause the control module 510 to apply the pulsed voltage control signal to the one of the one or more electronic fuel injector (e.g., the electronic fuel injector 540) and may monitor the fuel pressure signal from the fuel pressure sensor 560.

The control module 510 (e.g., the control unit 515) may cause the supply voltage provided to the control module 510 by the VPS 570 to be incrementally increased, for example by 0.5 volts, in a range of about twelve volts to fifteen volts. At each supply voltage increment, the control unit 515 may cause the control module 510 to reset the pulse width of the pulsed voltage control signal to the minimum pulse width and may determine the injector open time at each supply voltage increment based on the pulse width of the pulsed voltage control signal causing a sensed decrease in the fuel pressure.

Fuel pressure in the multiport fuel injection system 500 may be recharged (e.g., by operating the fuel pump 520 or by other pressurizing methods) before each successive test after the supply voltage provided by the VPS 570 is incremented. For example, after the injector opening time is determined based on the pulse width of the pulsed voltage control signal, control unit 515 may cause the control module 510 (e.g., the control unit 515) may cause the fuel pump 520 to operate to recharge the fuel pressure in the fuel rail 530. The procedure may be repeated for each incremental increase in supply voltage to the control module 510 to characterize the injector open time with respect to control module 510 supply voltage. The control unit 515 of the control module 510 may control the electronic fuel injectors (e.g., the electronic fuel injectors 540) during engine operation based on the injector open times and corresponding control module 510 supply voltages stored in the storage unit 517 to compensate for variations in the control module 510 supply voltage provided by the vehicle electrical system.

Various embodiments may configure the multiport fuel injection system 500 separately from a vehicle, for example, as a test apparatus mounted to a suitable structure as known to those of ordinary skill in the art. In a test apparatus configuration, the one or more of the electronic fuel injectors 540 may be installed in the test apparatus rather than being installed in an engine.

Figure 6:
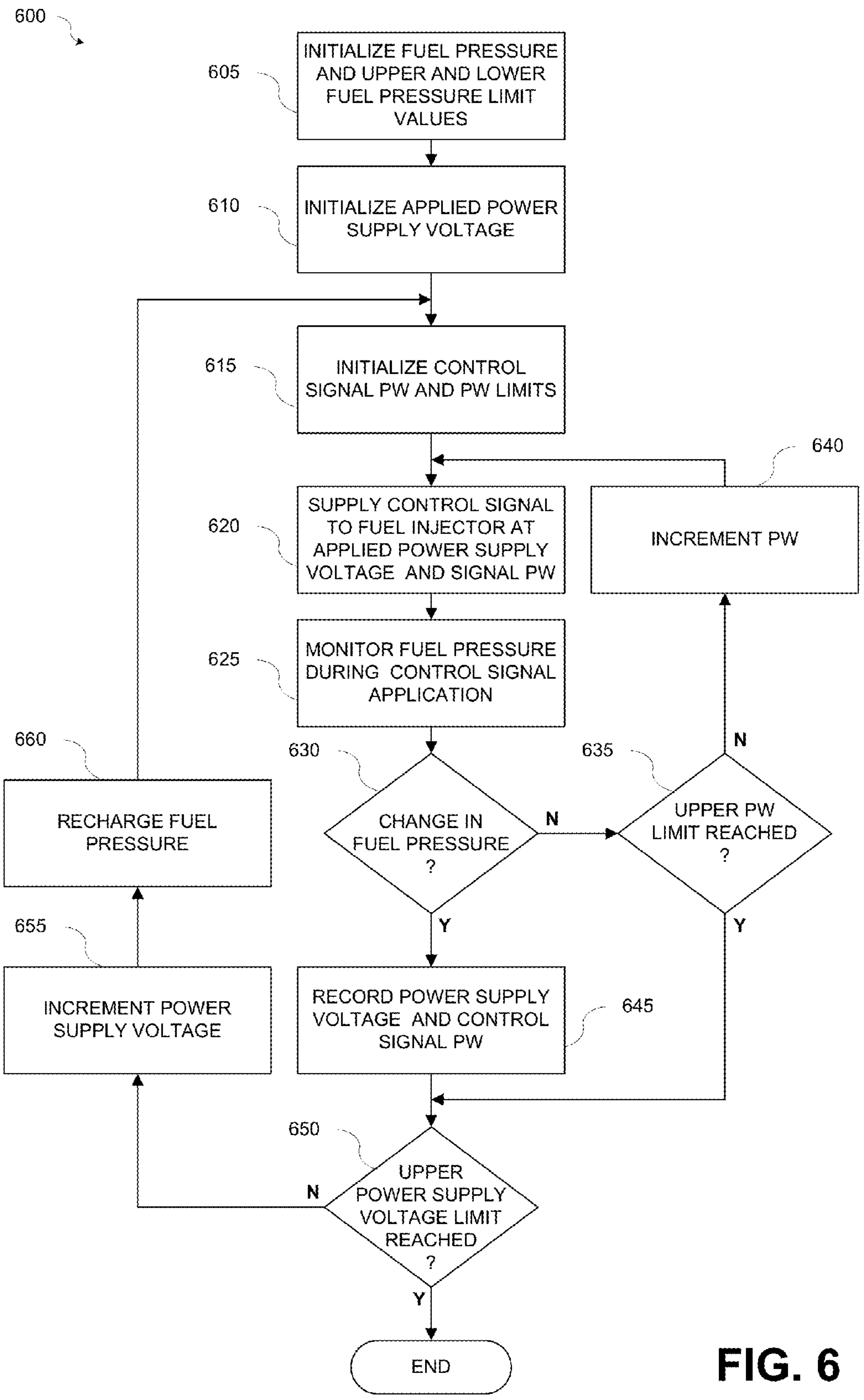
FIG. 6 is a flowchart illustrating a calibration method for an electronic fuel injector according to various embodiments.

FIG. 6 is a flowchart illustrating a calibration method 600 for an electronic fuel injector according to various embodiments. Referring to FIGS. 5 and 6, at block 605, the control unit 515 may cause the control module 510 to initialize the fuel pressure and the fuel pressure upper and lower limits. For example, the control module 510 (e.g., the control unit 515) may cause the fuel pump 520 to operate to charge the fuel pressure in the fuel rail 530 to a pressure in a range of about 30-70 pounds-per-square-inch (PSI) or another value. Alternatively, the fuel pressure in the fuel rail 530 may be charged by manual operation of the fuel pump 520 or by another pump. At block 610, the control module 510 (e.g., the control unit 515) may cause the VPS 570 to initialize the control module 510 supply voltage to a voltage in the range of about 11.5-12.5 volts. Alternatively, the control unit 515 may cause the control module 510 to provide an indication, for example, but not limited to, an indicator light or audible alert, to prompt manual initialization of the control module 510 supply voltage provided by the VPS 570.

After initializing the fuel pump pressure, fuel pressure limits, and control module 510 supply voltage, at block 615, the control unit 515 may cause the control module 510 to initialize the pulse width of the pulsed voltage control signal and the upper and lower pulse width limits. At block 620, the control unit 515 may cause the control module 510 to supply the pulsed voltage control signal having the set pulse width to an electronic fuel injector (e.g., one of the electronic fuel injectors 540) at the set control module 510 supply voltage.

At block 625, the control unit 515 may cause the control module 510 to monitor the fuel pressure in the fuel rail 530 (e.g., via a signal from the fuel pressure sensor 560) when the pulsed voltage control signal having the set pulse width is applied to the electronic fuel injector. At block 630, the control unit 515 may determine based on the signal received from the fuel pressure sensor 560 whether a change in fuel pressure occurs when the pulsed voltage control signal is applied to the electronic fuel injector (e.g., one of the electronic fuel injectors 540). For example, the control unit 515 may determine based on the signal received from the fuel pressure sensor 560 whether the fuel pressure decreases by about 0.2 psi (or another value) when the pulsed voltage control signal is applied to the electronic fuel injector.

In response to determining that the fuel pressure did not decrease (i.e., fuel pressure decreased less than about 0.2 psi or another value) (630—N), at block 635 the control unit 515 of the control module 510 may determine if the upper pulse width limit for the pulsed voltage control signal has been reached. In response to determining that the upper pulse width limit for the pulsed voltage control signal has not been reached (635—N), at block 640 the control unit 515 may increment (e.g., increase) the pulse width of the pulsed voltage control sign (e.g., by 50 μs or another value), and the method may continue at block 620.

In response to determining that the upper pulse width limit for the pulsed voltage control signal has been reached (635—Y), at block 650 the control unit 515 may determine if the upper limit for the control module 510 supply voltage has been reached. In response to determining that the upper limit for the control module 510 supply voltage has been reached (650—Y), the calibration method 600 may be complete.

In response to determining that the upper limit for the control module 510 supply voltage has not been reached (650—N), at block 655 the control unit 515 may increment (e.g., increase) the control module 510 supply voltage provided by the VPS 570 by about 0.5 volts or another value. For example, the control unit 515 may cause the VPS 570 to increment the control module 510 supply voltage by about 0.5 volts or another value. Alternatively, the control unit 515 may cause the control module 510 to provide an indication, for example, but not limited to, an indicator light or audible alert, to prompt manual incrementing of the control module 510 supply voltage provided by the VPS 570.

At block 660, the control module 510 (e.g., the control unit 515) may cause the fuel pump 520 to operate to recharge the fuel pressure in the fuel rail 530 to a pressure in a range of about 30-70 pounds-per-square-inch (PSI) or another value. Alternatively, the fuel pressure in the fuel rail 530 may be charged by manual operation of the fuel pump 520 or by another pump. The control module 510 (e.g., the control unit 515) may cause the method to continue at block 615. At block 615, the control unit 515 may again cause the control module 510 to initialize the pulse width of the pulsed voltage control signal and the upper and lower pulse width limits, and operation may continue with the incremented control module 510 supply voltage provided by the VPS 570.

In response to determining that the fuel pressure did decrease (i.e., fuel pressure decreased by about 0.2 PSI or another value) (630—Y), at block 645, the control unit 515 of the control module 510 may record the pulse width of the pulsed voltage control signal and the corresponding control module 510 supply voltage. For example, the control unit 515 of the control module 510 may record the pulse width of the pulsed voltage control signal and the corresponding control module 510 supply voltage in the storage unit 517.

At block 650, the control unit 515 may determine if the upper limit for the control module 510 supply voltage has been reached. In response to determining that the upper limit for the control module 510 supply voltage has been reached (650—Y), the calibration method 600 may be complete.

In response to determining that the upper limit for the control module 510 supply voltage has not been reached (650—N), at block 655 the control unit 515 may increment the control module 510 supply voltage provided by the VPS 570 by about 0.5 volts or another value. For example, the control unit 515) may cause the VPS 570 to increment the control module 510 supply voltage by about 0.5 volts or another value. Alternatively, the control unit 515 may cause the control module 510 to provide an indication, for example, but not limited to, an indicator light or audible alert, to prompt manual incrementing of the control module 510 supply voltage provided by the VPS 570.

At block 660, the control module 510 (e.g., the control unit 515) may cause the fuel pump 520 to operate to recharge the fuel pressure in the fuel rail 530 to a pressure in a range of about 30-70 pounds-per-square-inch (PSI) or another value. Alternatively, the fuel pressure in the fuel rail 530 may be charged by manual operation of the fuel pump 520 or by another pump. The control module 510 (e.g., the control unit 515) may cause the method to continue at block 615. At block 615, the control unit 515 may again cause the control module 510 to initialize the pulse width of the pulsed voltage control signal and the upper and lower pulse width limits, and operation may continue with the incremented control module 510 supply voltage provided by the VPS 570.

Subsequent to performing the calibration method 600, the control unit 515 of the control module 510 may control the electronic fuel injectors (e.g., the electronic fuel injectors 540) during engine operation based on the injector open times and corresponding control module 510 supply voltages stored in the storage unit 517 to compensate for variations in the control module 510 supply voltage provided by the vehicle electrical system. For example, the control unit 515 of the control module 510 may select a stored pulse width corresponding to a stored supply voltage that most closely corresponds to the control module 510 supply voltage provided by the vehicle electrical system, and cause the control module 510 to supply a control voltage signal having the selected pulse width to one or more of the electronic fuel injectors.

The control module 510 may be externally programmed with instructions for performing the method 600. Alternatively, the control module 510 may not be externally programmable and the instructions for performing the method 600 may be pre-programmed in firmware of the control module 510. For instance, a programmable logic device, for example, but not limited to, an electronically programmable read-only memory (EPROM), electronically erasable programmable read-only memory (EEPROM), etc., may be preprogrammed and installed in the control module 510.

The method 600 described with respect to FIG. 6 may be embodied on a non-transitory computer readable medium, for example, but not limited to, the storage unit 517 or other non-transitory computer readable medium known to those of skill in the art, having stored therein a program including computer executable instructions for making a processor, computer, or other programmable device execute the operations of the method.

Figure 7:
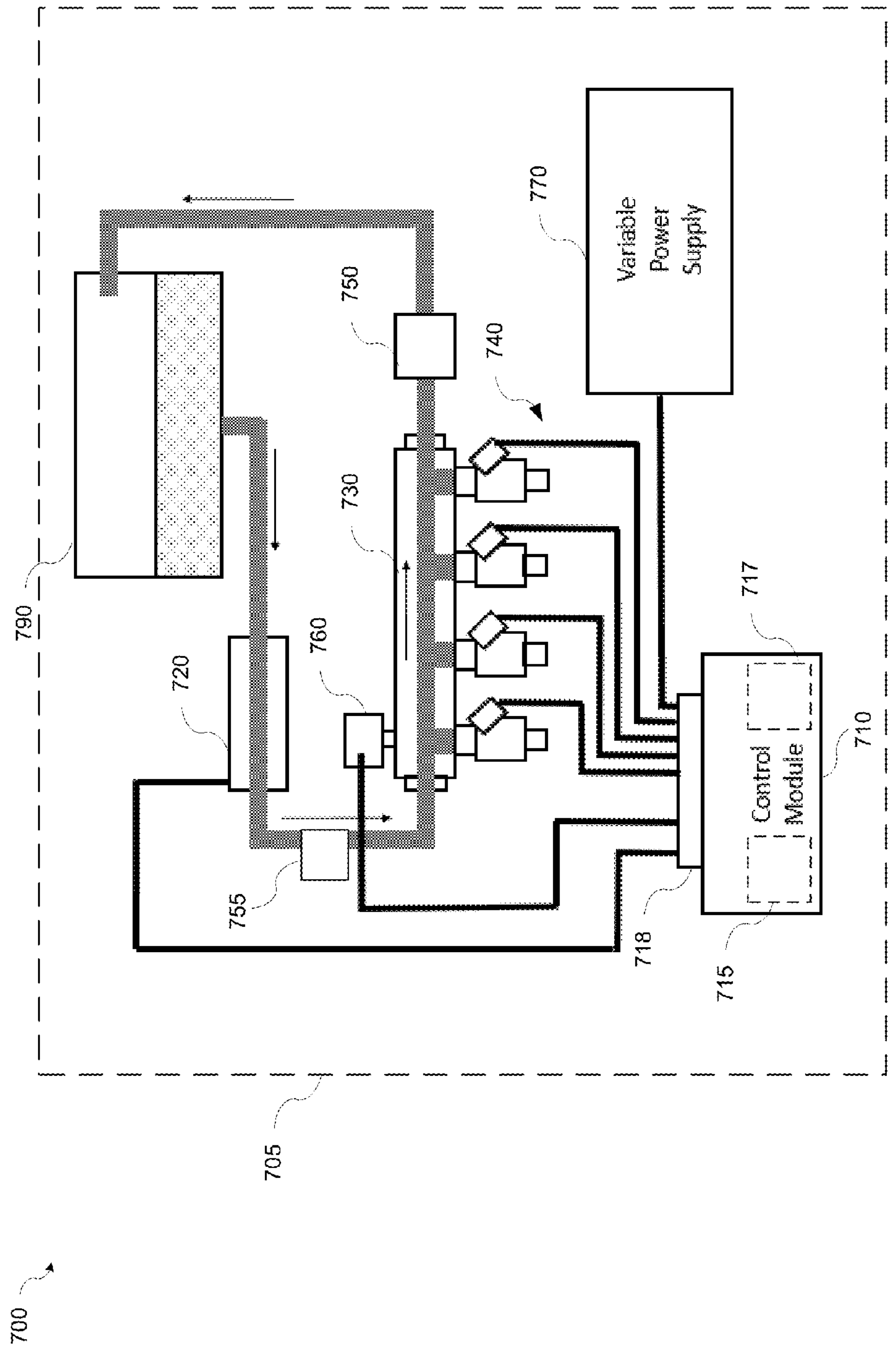
FIG. 7 is a diagram illustrating a test apparatus for electronic fuel injector calibration according to various embodiments.

In some embodiments, the calibration method 600 for a multiport fuel injection system may be performed on a test apparatus. FIG. 7 is a diagram illustrating a test apparatus 700 for electronic fuel injector calibration according to various embodiments. Referring to FIG. 7, the test apparatus 700 may include a fuel tank 790, a fuel pump 720, a fuel rail

730, a pressure regulator 750, a blocking valve 755, a fuel pressure sensor 760, and a variable power supply (VPS) 770. One or more electronic fuel injectors 740 to be calibrated may be mounted to the fuel rail 730. These components may be similar to the corresponding components in the multiport fuel injection calibration system 500 previously described and illustrated in FIG. 5 and so will not be further described.

The test apparatus 700 for multiport fuel injection calibration may also include a test control module 710. The test control module 710 may include a control unit 715, for example, but not limited to, a microprocessor, a microcontroller, or other programmable device, and may further include a storage unit 717, for example, but not limited to, RAM, ROM, EEPROM, or other memory, or combinations thereof, and driver circuitry 718 configured to provide control signals to the electronic fuel injectors 740 and the fuel pump 720. The test control module 710 may be, for example, a commercially available PCM (e.g., the PCM 210), a control module (e.g., the control module 510), or other circuitry configured to provide pulsed voltage control signals having adjustable pulse widths to one or more electronic fuel injectors undergoing calibration. The components of the test apparatus 700 may be configured on a test stand 705, for example a bench or table, separate from a vehicle.

In various embodiments, the control unit 715 may cause the test control module 710 to provide a control signal to the VPS 770 to increment the supply voltage. In various embodiments, the control unit 715 may cause the test control module 710 to provide an indication, for example, but not limited to, an indicator light, audible beep, etc., for manual adjustment of the control module 710 supply voltage provided by the VPS 770. The control unit 715 of the test control module 710 may cause the test apparatus 700 to perform the method 600 and store injector open times and corresponding test control module 710 supply voltages in the storage unit 717 of the test control module 710.

The injector open times and corresponding test control module 710 supply voltages stored in the storage unit 717 of the test control module 710 may be read out of the storage unit 717 and programmed into a programmable logic device, for example, but not limited to, an electronically programmable read-only memory (EPROM), electronically erasable programmable read-only memory (EEPROM), etc., using techniques and equipment known to those of skill in the art. The programmable device thus programmed may be installed in a PCM or other control module (e.g., the PCM 210 or control module 510) that is part of a vehicle engine control system. Alternatively, the programmable device may be programmed while installed in the PCM or other control module (e.g., the PCM 210 or control module 510) of the vehicle via an electronic interface and equipment known to those of skill in the art. The PCM or other control module (e.g., the PCM 210 or control module 510) may control the electronic fuel injectors (e.g., the electronic fuel injectors 540) during engine operation based on the injector open times and corresponding PCM or control module supply voltages stored in the programmable logic device to compensate for variations in the PCM or control module supply voltage provided by the vehicle electrical system.

While the example embodiments are described in terms of multiport fuel injection systems, on of ordinary skill in the art will appreciate that the present inventive concept is extended to all types of electronic fuel injectors, for example, but not limited to throttle body fuel injectors, port fuel injectors, direct fuel injectors, etc., without departing from the scope of protection of the present inventive concept.

One of ordinary skill in the art will also appreciate that the term powertrain control module (PCM) will encompass any control module, controller, or circuitry capable of performing the above-described operations at least with respect to the electronic fuel injectors and fuel supply system without departing from the scope of protection of the present inventive concept.

The accompanying claims and their equivalents are intended to cover such forms or modifications as would fall within the scope and spirit of the protection. For example, the example apparatuses, methods, and systems disclosed herein can be applied to electronic fuel injection systems. The various components illustrated in the figures may be implemented as, for example, but not limited to, software and/or firmware on a processor, ASIC/FPGA/DSP, or dedicated hardware. Also, the features and attributes of the specific example embodiments disclosed above may be combined in different ways to form additional embodiments, all of which fall within the scope of the present disclosure.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc., are not intended to limit the order of the operations; these words are simply used to guide the reader through the description of the methods. Further, any reference to claim elements in the singular, for example, using the articles "a," "an," or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for calibrating an electronic fuel injector, the method comprising:

setting a supply voltage to a control module;

applying a control voltage signal having a pulse width to an electronic fuel injector, wherein the control module is configured to apply the control voltage signal;

determining whether a fuel pressure of a fuel supply to the electronic fuel injector decreases by a predetermined amount; and in response to determining that the fuel pressure of the fuel supply to the electronic fuel injector decreases by the predetermined amount, recording the pulse width and the supply voltage to the control module;

in response to determining that the fuel pressure of the fuel supply to the electronic fuel injector does not decrease by the predetermined amount:

incrementally increasing the pulse width of the control voltage signal;

applying the control voltage signal to the electronic fuel injector after each incremental increase in the pulse width;

determining at each application of the control voltage signal whether the fuel pressure of the fuel supply to the electronic fuel injector decreases by the predetermined amount; and in response to determining that the fuel pressure of the fuel supply to the electronic fuel injector decreases by the predetermined amount, recording the pulse width and the supply voltage to the control module, wherein the control module comprises a processor and a storage unit.

2. The method of claim 1, further comprising:

in response to determining that the fuel pressure of the fuel supply to the electronic fuel injector does not decrease by the predetermined amount:

determining whether an upper pulse width limit for the control voltage signal has been reached; and in response to determining that the upper pulse width limit has been reached, increasing the supply voltage to the control module;

setting the pulse width of the control voltage signal to a minimum pulse width;

applying the control voltage signal to the electronic fuel injector;

determining whether the fuel pressure of the fuel supply to the electronic fuel injector decreases by the predetermined amount;

in response to determining that the fuel pressure of the fuel supply to the electronic fuel injector decreases by the predetermined amount, recording the pulse width and the supply voltage to the control module.

3. The method of claim 2, further comprising:

for each increase in the supply voltage to the control module, recording the pulse width and corresponding supply voltage that causes the fuel pressure of the fuel supply to the electronic fuel injector to decrease by the predetermined amount.

4. The method of claim 3, wherein the recording the pulse width and corresponding supply voltage comprises:

storing in a storage unit each pulse width and corresponding supply voltage that causes the fuel pressure of the fuel supply to the electronic fuel injector to decrease by the predetermined amount.

5. The method of claim 4, further comprising:

controlling operation of the electronic fuel injector during internal combustion engine operation under varying supply voltages provided by an electrical system to the control module based on the stored pulse widths and corresponding supply voltages.

6. The method of claim 1, further comprising:

increasing the supply voltage to the control module by a predetermined voltage increment; and at each incremental increase in the supply voltage to the control module:

setting the pulse width of the control voltage signal to a minimum pulse width;

applying the control voltage signal to the electronic fuel injector;

increasing the pulse width of the control voltage signal by a predetermined pulse width increment and applying the control voltage signal to the electronic fuel injector at each incremental increase in pulse width until the fuel pressure of the fuel supply to the electronic fuel injector decreases by the predetermined amount; and recording the pulse width that causes the fuel pressure of the fuel supply to the electronic fuel injector to decrease by the predetermined amount and the supply voltage to the control module corresponding to the pulse width.

7. The method of claim 6, wherein the increasing the supply voltage to the control module by the predetermined voltage increment comprises:

automatically increasing the supply voltage to the control module based on a control signal to a variable power supply.

8. The method of claim 6, wherein the increasing the supply voltage to the control module by the predetermined voltage increment comprises:

manually increasing the supply voltage to the control module provided by a variable power supply based on an indication from the control module.

9. The method of claim 6, wherein the recording the pulse width that causes the fuel pressure of the fuel supply to the electronic fuel injector decrease by the predetermined amount and the supply voltage to the control module corresponding to the pulse width comprises:

storing in a storage unit each pulse width and corresponding supply voltage that causes the fuel pressure of the fuel supply to the electronic fuel injector to decrease by the predetermined amount.

10. The method of claim 9, further comprising:

controlling operation of the electronic fuel injector during internal combustion engine operation under varying supply voltages provided by an electrical system to the control module based on the stored pulse widths and corresponding supply voltages.

11. An apparatus for calibrating an electronic fuel injector, the apparatus comprising:

a control module installed in a vehicle; and a variable power supply configured to provide a supply voltage to the control module;

the control module comprising:

a processor;

a storage unit; and driver circuitry configured to provide a control voltage signal to an electronic fuel injectors installed in the vehicle;

the control module configured to:

apply the control voltage signal having a pulse width to the electronic fuel injector;

determine whether a fuel pressure of a fuel supply to the electronic fuel injector decreases by a predetermined amount based on a signal received from a fuel pressure sensor;

in response to determining that the fuel pressure of the fuel supply to the electronic fuel injector decreases by a predetermined amount, record the pulse width and the supply voltage to the control module; and in response to determining that the fuel pressure of the fuel supply to the electronic fuel injector does not decrease by the predetermined amount:

incrementally increase the pulse width of the control voltage signal;

cause the driver circuitry to apply the control voltage signal to the electronic fuel injector after each incremental increase in the pulse width;

determine at each application of the control voltage signal whether the fuel pressure of the fuel supply to the electronic fuel injector decreases by the predetermined amount; and in response to determining that the fuel pressure of the fuel supply to the electronic fuel injector decreases by the predetermined amount, record the pulse width and the supply voltage to the control module.

12. The apparatus of claim 11, wherein the control module is further configured to:

in response to determining that the fuel pressure of the fuel supply to the electronic fuel injector does not decrease by the predetermined amount:

determine whether an upper pulse width limit for the control voltage signal has been reached;

in response to determining that the upper pulse width limit has been reached:

cause the variable power supply to increase the supply voltage to the control module;

set the pulse width of the control voltage signal to a minimum pulse width;

apply the control voltage signal to the electronic fuel injector;

determine whether the fuel pressure of the fuel supply to the electronic fuel injector decreases by the predetermined amount; and in response to determining that the fuel pressure of the fuel supply to the electronic fuel injector decreases by the predetermined amount, record the pulse width and the supply voltage to the control module.

13. The apparatus of claim 12, wherein for each increase in the supply voltage to the control module, the control module records the pulse width and corresponding supply voltage that causes the fuel pressure of the fuel supply to the electronic fuel injector to decrease by the predetermined amount.

14. The apparatus of claim 13, wherein the control module is configured to store in the storage unit each pulse width and corresponding supply voltage that causes the fuel pressure of the fuel supply to the electronic fuel injector to decrease by the predetermined amount.

15. The apparatus of claim 14, wherein the control module is further configured to control operation of the electronic fuel injector during internal combustion engine operation under varying supply voltages provided by an electrical system to the control module based on the stored pulse widths and corresponding supply voltages.

16. The apparatus of claim 11, wherein the control module is further configured to:

increase the supply voltage to the control module by a predetermined voltage increment; and at each incremental increase in the supply voltage to the control module:

set the pulse width of the control voltage signal to a minimum pulse width;

apply the control voltage signal to the electronic fuel injector;

increase the pulse width of the control voltage signal by a predetermined pulse width increment and apply the control voltage signal to the electronic fuel injector at each incremental increase in pulse width until the fuel pressure of the fuel supply to the electronic fuel injector decreases by the predetermined amount; and record the pulse width that causes the fuel pressure of the fuel supply to the electronic fuel injector to decrease by the predetermined amount and the supply voltage to the control module corresponding to the pulse width.

17. The apparatus of claim 16, wherein the control module is configured to automatically increase the supply voltage to the control module based on a control signal to the variable power supply.

18. The apparatus of claim 16, wherein the control module is configured to generate an indication to manually increase the supply voltage to the control module provided by the variable power supply.

19. The apparatus of claim 16, wherein the control module is configured to store in the storage unit each pulse width and corresponding supply voltage that causes the fuel pressure of the fuel supply to the electronic fuel injector to decrease by the predetermined amount.

20. The apparatus of claim 19, wherein the control module is further configured to control operation of the electronic fuel injector during internal combustion engine operation under varying supply voltages provided by an electrical system to the control module based on the stored pulse widths and corresponding supply voltages.

21. A non-transitory computer readable medium having stored thereon instructions for causing one or more processors to perform a calibration method for an electronic fuel injector, the operations including:

setting a supply voltage to a control module;

applying a control voltage signal having a pulse width to an electronic fuel injector by the control module;

determining whether a fuel pressure of a fuel supply to the electronic fuel injector decreases by a predetermined amount;

in response to determining that the fuel pressure of the fuel supply to the electronic fuel injector decreases by the predetermined amount, recording the pulse width and the supply voltage to the control module; and in response to determining that the fuel pressure of the fuel supply to the electronic fuel injector does not decrease by the predetermined amount:

incrementally increasing the pulse width of the control voltage signal;

applying the control voltage signal to the electronic fuel injector after each incremental increase in the pulse width;

determining at each application of the control voltage signal whether the fuel pressure of the fuel supply to the electronic fuel injector decreases by the predetermined amount; and in response to determining that the fuel pressure of the fuel supply to the electronic fuel injector decreases by the predetermined amount, recording the pulse width and the supply voltage to the control module.

22. The non-transitory computer readable medium having stored therein instructions as defined in claim 21, the instructions further including:

in response to determining that the fuel pressure of the fuel supply to the electronic fuel injector does not decrease by the predetermined amount:

determining whether an upper pulse width limit for the control voltage signal has been reached; and in response to determining that the upper pulse width limit has been reached, increasing the supply voltage to the control module;

setting the pulse width of the control voltage signal to a minimum pulse width;

applying the control voltage signal to the electronic fuel injector;

determining whether the fuel pressure of the fuel supply to the electronic fuel injector decreases by the predetermined amount;

in response to determining that the fuel pressure of the fuel supply to the electronic fuel injector decreases by the predetermined amount, recording the pulse width and the supply voltage to the control module.

* * * * *